(12) United States Patent
Li et al.

(10) Patent No.: US 11,474,001 B2
(45) Date of Patent: Oct. 18, 2022

(54) COMPREHENSIVE PERFORMANCE TEST PLATFORM FOR ACOUSTIC LINER

(71) Applicant: Beihang University, Beijing (CN)

(72) Inventors: Xiaodong Li, Beijing (CN); Mingyang Zheng, Beijing (CN); Chao Chen, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 17/722,473

(22) Filed: Apr. 18, 2022

(65) Prior Publication Data

US 2022/0236138 A1 Jul. 28, 2022

Related U.S. Application Data

(63) Continuation of application No. PCT/CN2021/137781, filed on Dec. 14, 2021.

(30) Foreign Application Priority Data

Jul. 13, 2021 (CN) .......................... 2021107876026

(51) Int. Cl.
  *G01M 9/06* (2006.01)
  *G01M 9/04* (2006.01)
(52) U.S. Cl.
  CPC .............. *G01M 9/062* (2013.01); *G01M 9/04* (2013.01)
(58) Field of Classification Search
  None
  See application file for complete search history.

(56) References Cited

U.S. PATENT DOCUMENTS

| 10,168,204 B2 * | 1/2019 | Choi ....................... G01M 3/24 |
| 2002/0079159 A1 * | 6/2002 | Liu ........................ F04D 29/665 |
| | | 181/224 |

FOREIGN PATENT DOCUMENTS

| CN | 101571448 A | 11/2009 |
| CN | 111044251 A | 4/2020 |
| CN | 111289257 A * | 6/2020 |

OTHER PUBLICATIONS

Xianghai Qiu, et al. "Investigation of straightforward impedance eduction method on single-degree-of-freedom acoustic liners" Chinese Journal of Aeronautics Pub Date: Sep. 5, 2018 31(12):2221-2233.

* cited by examiner

*Primary Examiner* — Peter J Macchiarolo
*Assistant Examiner* — Jermaine L Jenkins
(74) *Attorney, Agent, or Firm* — IPro, PLLC; Na Xu (57) ABSTRACT

The present disclosure relates to the technical field of aerodynamic and acoustic measurement, in particular to a comprehensive performance test platform for acoustic liner. Based on this comprehensive performance test platform for acoustic liner, the stress of the measured acoustic liner under high sound intensity can be measured by using strain gauges arranged on the measured acoustic liner, the aerodynamic drag of the measured acoustic liner can be measured by using the drag balance, and the acoustic performance parameters of the measured acoustic liner can be calculated based on the sound pressure data obtained by the microphone array. With this test platform, the stress, the aerodynamic drag and the acoustic performance parameters of the measured acoustic liner can be measured simultaneously, which overcomes the problem of inaccurate experimental data obtained in inconsistent experimental conditions caused by conventional separate acoustic liner tests.

20 Claims, 4 Drawing Sheets

COMPREHENSIVE PERFORMANCE TEST PLATFORM FOR ACOUSTIC LINER

FIELD OF THE INVENTION

The present disclosure relates to the technical field of aerodynamic and acoustic measurement, in particular to a comprehensive performance test platform for acoustic liner.

BACKGROUND OF THE INVENTION

The acoustic liner of aeroengine nacelle is an effective passive noise reduction structure. Due to the perforation on the surface, it's inevitable for acoustic liners to increase the aerodynamic drag compared with the smooth wall, which causes an additional fuel consumption during a flight. In addition, the effect of incident sound wave will bring additional drag increase, and the noise with high sound intensity will lead to acoustic liner fatigue and then induce acoustic resonance, which will bring potential safety hazards to the structure of the compression system.

In the existing method for measuring the performance parameters of the acoustic liner, the measured acoustic liner is usually flush with the lower wall surface of a flow tube, the flow drag is measured by using a force measuring mechanism, and the acoustic impedance is measured by using the microphone array on the opposite wall of the acoustic liner. The existing research on the flow drag of acoustic liner usually only focuses on the influence of the surface configuration of acoustic liner, but since the acoustic liner is a sound absorbing structure, the incoming sound wave will also influence the drag of acoustic liner. In addition, the existing tests of acoustic liner drag and of acoustic impedance are separate each other. However, if the two tests are not carried out at the same time, the conditions cannot be completely consistent, so that the measured drag and acoustic impedance can not correspond with each other, which is not conducive to synthetically designing the acoustic liner in aerodynamic and acoustic.

SUMMARY OF THE INVENTION

In order to solve at least one of the above technical problems, the present disclosure provides a comprehensive performance test platform for acoustic liner.

According to the present disclosure, the comprehensive performance test platform for acoustic liner comprises a flow duct and a test chamber, wherein, the flow duct is configured to provide a channel for airflow;

the flow duct comprises an acoustic source section and a test section which is located downstream of the acoustic source section;

a wall surface of the acoustic source section is provided with a loudspeaker array;

the test chamber is arranged on the test section, and the interior of the test chamber can be provided with the acoustic liner specimen, acceleration transducer and drag balance; the measured acoustic liner is provided with a strain gauge, and the measured acoustic liner is connected to the acceleration transducer; and the drag balance is connected to a bearing tray and the bearing tray is fixedly connected to the measured acoustic liner; and the measured acoustic liner is flush with the wall surface of the test section, the wall surface of the test section of the test section upstream of the measured acoustic liner is provided with a first microphone array, the wall surface of the test section opposite or adjacent to the measured acoustic liner is provided with a second microphone array and the wall surface of the test section downstream of the measured acoustic liner is provided with a third microphone array.

Optionally, the wall surface of the acoustic source section is provided with N loudspeaker arrays and N is an integer not less than 1; and a loudspeaker array include M loudspeakers, which are arranged on the wall surface of the acoustic source section in a circumferential direction of the acoustic source section, and M is an integer not less than 1.

Optionally, strain gauges are provided at the perforated plate and at a honeycomb cavity of the measured acoustic liner.

Optionally, an adjustment mechanism is disposed in the test chamber and the adjustment mechanism is connected to the drag balance.

Optionally, the wall surface of the test section is provided with a pressure probe array;

when the wall surface of the test section opposite to the measured acoustic liner is provided with the pressure probe array, pressure probes in the pressure probe array and microphones in the second microphone array are arranged symmetrically along a central axis of the flow duct.

Optionally, the flow duct comprises a first anechoic termination and a second anechoic termination, wherein, the first anechoic termination is set upstream of the acoustic source section and the second anechoic termination is set downstream of the test section;

the wall surface of each anechoic termination is provided with at least two symmetrical wedge-shaped structures and sound-absorbing materials are provided in a cavity of the wedge-shaped structure; and a perforated plate with wire mesh forms an interface between the wedge-shaped structure and the anechoic termination.

Optionally, the first anechoic termination, the acoustic source section, the test section and the second anechoic termination are connected through flanges.

Optionally, the test platform comprises a displacement mechanism and a flow rate meter, wherein, the displacement mechanism comprises a first slide rail and a second slide rail, the first slide rail and the second slide rail are respectively connected to the flow rate meter, and the flow rate meter is configured to measure the airflow velocity in the flow duct;

when the first slide rail is driven by a motor, the first slide rail move the flow rate meter in a first direction; and when the second slide rail is driven by the motor, the second slide rail move the flow rate meter in a second direction.

Optionally, when it is need to measure the airflow velocity in the flow duct, the first slide rail and/or the second slide rail causes the flow rate meter to extend into the flow duct;

when it is not need to measure the airflow velocity in the flow duct, the first slide rail and/or the second slide rail causes the flow rate meter to extend out of the flow duct; and a sealing element is arranged where the flow rate meter and the flow duct are connected.

Optionally, the wall surface of the test section is provided with a watch window.

The technical solutions provided by the embodiments of the present disclosure at least include the following beneficial effects.

Based on the comprehensive performance test platform for acoustic liner provided by the embodiments of the present disclosure, the stress of the measured acoustic liner under high sound intensity can be measured by using the strain gauge arranged on the measured acoustic liner, the drag of the measured acoustic liner can be measured by using the drag balance and the acoustic performance parameters of the measured acoustic liner can be calculated based on the sound pressure data obtained by the microphone arrays. That is, with the comprehensive performance test platform for acoustic liner provided by the embodiments of the present disclosure, the stress, the drag and the acoustic performance parameters of the measured acoustic liner can be measured simultaneously, which overcomes the problem of inaccurate experimental data obtained in inconsistent experimental conditions caused by conventional separate acoustic liner tests.

BRIEF DESCRIPTION OF THE DRAWINGS

In order to more clearly explain the technical solutions according to embodiments of the present disclosure or the prior art, the following will briefly introduce the drawings required to be used in the description of the embodiments or the prior art. It is obvious that the drawings in the following description are included in the specification and form a part of the specification. For those skilled in the art, other drawings can also be obtained from these drawings without creative effort. For ease of description, only parts related to the present disclosure are shown in the drawings.

List of reference numbers: 100-flow duct, 101-first microphone array, 102-second microphone array, 103-third microphone array, 104-pressure probe array, 105-wedge-shaped structure, 151-triangular support plate, 106-perforated plate, 107-displacement mechanism, 108-flow rate meter, 109-sealing element, 110-bracket, 111-pedestal, 112-watch window, 113-flange, 171-first slide rail, 172-second slide rail, 173-support of slide rail, 174-sleeve, 175-connecting rod, 176-slider, 177-fixed block, 178-electric motor, 200-test chamber, 201-measured acoustic liner, 211-strain gauge, 202-acceleration transducer, 203-drag balance, 204-bearing tray, 205-adjustment mechanism, 301-loudspeaker array, 001-first anechoic termination; 002-acoustic source section, 003-test section, 004-second anechoic termination.

DETAILED DESCRIPTION OF THE INVENTION

In order to make the purpose, technical solutions and advantages of the embodiments of the present disclosure more clear, the technical solutions of the embodiments will be clearly and completely described below in combination with the drawings of the embodiments. Obviously, the described embodiments are part, not all, of embodiments of the present disclosure. The embodiments of the present disclosure and the features in the embodiments can be combined with each other without conflict. Based on the embodiments in the present disclosure, all other embodiments obtained by those skilled in the art without inventive work are within the scope of protection of the present disclosure.

Figure 1:
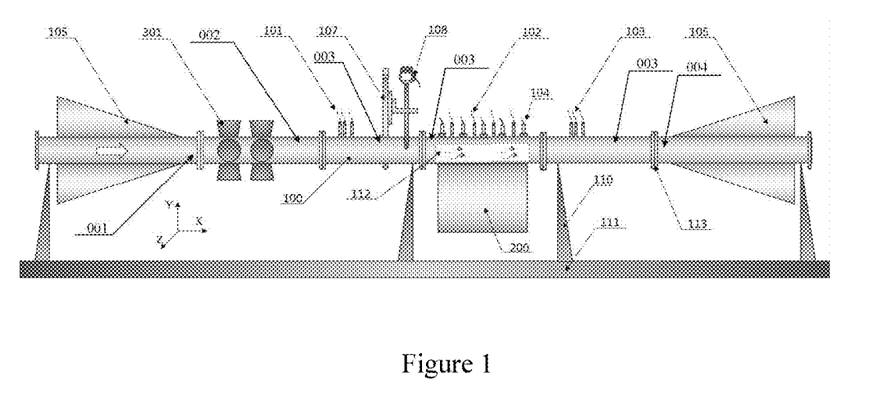
FIG. 1 is a schematic diagram of comprehensive performance test platform for acoustic liner provided by the embodiments of the present disclosure.

Embodiments of the present disclosure provide a comprehensive performance test platform for acoustic liner. As shown in FIG. 1, the test platform comprises:

a flow duct 100 and a test chamber 200, wherein the flow duct 100 is configured to provide a channel for airflow;

the flow duct 100 comprising an acoustic source section and a test section, wherein the test section is located behind (downstream of) the acoustic source section;

wherein a wall surface of the acoustic source section is provided with a loudspeaker array 301;

wherein the test chamber 200 is arranged on the test section, and the interior of the test chamber 200 is provided with an acoustic liner to be measured 201, an acceleration transducer 202 and a drag balance 203; the measured acoustic liner 201 is provided with a strain gauge 211 and is connected to the acceleration transducer 202; and the drag balance 203 is connected to a bearing tray 204 and the bearing tray 204 is fixedly connected to the measured acoustic liner 201; and wherein the measured acoustic liner 201 can be flush with (abut) the wall surface of the test section, a first microphone array 101 is provided on the wall surface of the test section in front of (upstream of) the measured acoustic liner 201, a second microphone array 102 is provided on the wall surface of the test section opposite or adjacent to the measured acoustic liner 201, and a third microphone array 103 is provided on the wall surface of the test section behind (downstream of) the measured acoustic liner 201.

The comprehensive performance test platform for acoustic liner provided by the embodiments of the present disclosure comprises a flow duct 100 and a test chamber 200. For example, the flow duct 100 can be a straight pipe, the cross section of the flow duct 100 can be rectangular and the airflow can flow along the flow duct 100. As shown in FIG. 1, the arrow direction is the flow direction of airflow and acoustic wave. As shown in FIG. 1, the flow duct 100 comprises an acoustic source section and a test section, with the test section located downstream of the acoustic source section. That is, the acoustic source section is located upstream of the test section, so as to provide an incident sound wave for the airflow through the acoustic source section. For example, the flow duct 100 can be formed by joining a plurality of pipe units, and the acoustic source section and the test section can be joined as pipe units to form the flow duct 100.

Figure 2:
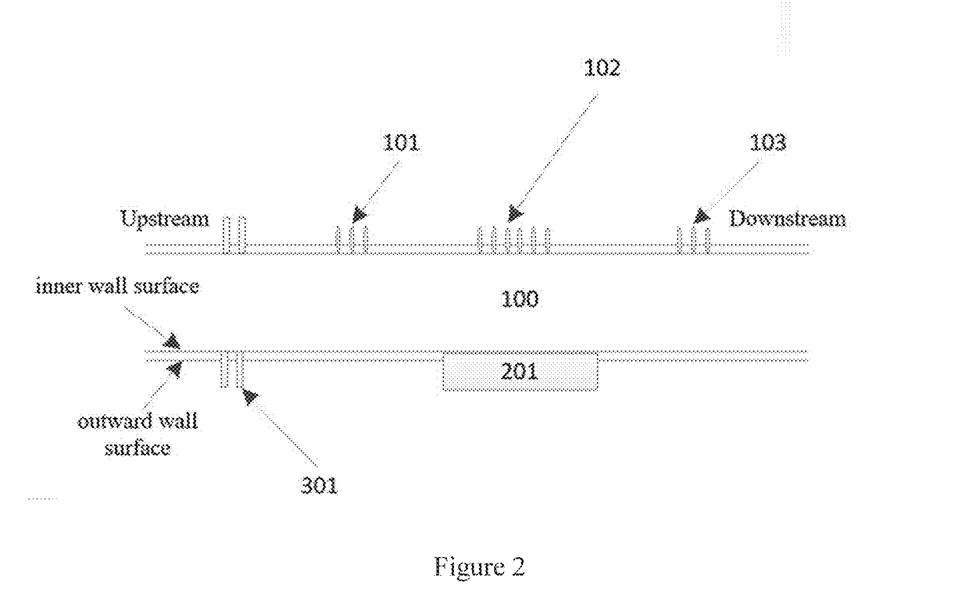
FIG. 2 is another schematic diagram of comprehensive performance test platform for acoustic liner provided by the embodiments of the present disclosure.

As shown in FIG. 2, the measured acoustic liner 201 can be flush with the lower wall surface of the flow duct 100. Since the flow duct 100 usually has a certain thickness, the wall surfaces of the flow duct 100 can comprise an outer wall surface and an inner wall surface. In order to obtain more accurate measurement data, the measured acoustic liner 201 can be completely and closely flush with the inner wall surface of the flow duct 100, and the loudspeaker array 301, the microphone arrays and the pressure probe array 104 can also be arranged on the inner wall surface of the flow duct 100. It should be noted that a gap between the measured acoustic liner 201 and the flow duct 100 in FIG. 2 is only to facilitate the representation of the positional relationship between the measured acoustic liner 201 and the flow duct 100. In practical use, because the sound-absorbing surface of acoustic liner is usually rectangular, when the cross section of the flow duct 100 is rectangular, the sound-absorbing surface of the measured acoustic liner 201 can be completely and closely flush with the lower wall surface of the flow duct 100. In this example, the area of the wall surface where the measured acoustic liner 201 and the test section are in contact depends on the area of the sound-absorbing surface of the measured acoustic liner 201, and the length of the wall surface where the measured acoustic liner 201 and the test section are in contact depends on the length of the measured acoustic liner 201.

Figure 3:
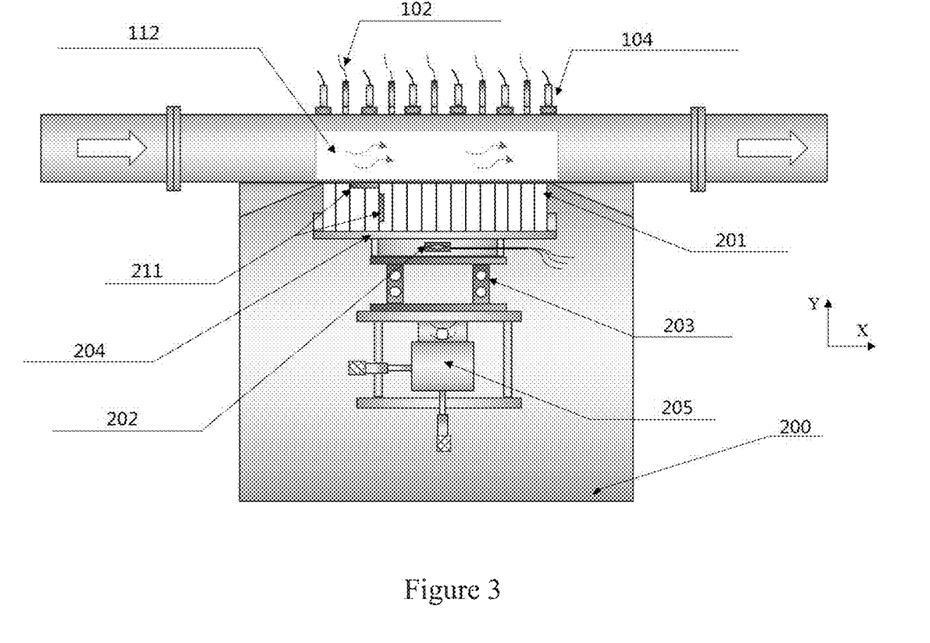
FIG. 3 is a schematic diagram of test section of the comprehensive performance test platform for acoustic liner provided by the embodiments of the present disclosure.

As shown in FIG. 3, the measured acoustic liner 201 is connected to the acceleration transducer 202, so that the vibration response of the measured acoustic liner 201 under high sound intensity can be measured by the acceleration transducer 202. In this case, the acceleration transducer 202 can be located below the measured acoustic liner 201 in the gravity direction, or the acceleration transducer 202 can be not located below the measured acoustic liner 201 in the gravity direction, that is, the acceleration transducer 202 can be located according to the actual needs. The upper part of the drag balance 203 in the gravity direction can be connected to the bearing tray 204 and the bearing tray 204 can be fixedly connected to the measured acoustic liner 201, so that the drag on the measured acoustic liner 201 can be transmitted to the drag balance 203 through the bearing tray 204 and then the drag borne by the measured acoustic liner 201 can be measured directly through the drag balance 203. In this case, the acceleration transducer 202 can be fixed on the bearing tray 204, and the drag balance 203 can be arranged below the measured acoustic liner 201 and the acceleration transducer 202 in the gravity direction.

In an optional embodiment, the wall surface of the acoustic source section is provided with N loudspeaker arrays 301 and N is an integer not less than 1. For example, N can be 1, 2, 3 . . . N. A loudspeaker array can include M loudspeakers and the M loudspeakers in the loudspeaker array can be arranged on the outer wall surface of the acoustic source section at equal intervals in the circumferential direction of the acoustic source section. For example, M is an integer not less than 1. For example, one loudspeaker array can include 1, 2, 3, 4 or more loudspeakers. In order to more clearly describe the technical solution of this embodiment, Cartesian coordinates (X, Y, Z) are used and all descriptions of directions involved in this disclosure can refer to this coordinate system. In the Cartesian coordinates, X represents axial direction, Y represents vertical direction, Z represents transverse direction, and the vertical direction is the same as the gravity direction. As shown in FIG. 1, when a loudspeaker array includes four loudspeakers, the four loudspeakers can be arranged to surround the wall surface of the acoustic source section. In this example, the coordinates of the four loudspeakers on the X direction are equal. By setting appropriate amplitude and phase, a plurality of loudspeaker arrays can realize the superposition of incident sound wave and the incident sound wave can propagate along the X-direction with airflow, then the incident sound pressure level can reach 150 dB or more in front of (upstream of) the test section. When a plurality of loudspeaker arrays are arranged on the outer wall surface of the acoustic source section, the distance between loudspeaker arrays can be adjusted by a worker according to the actual needs.

As shown in FIG. 3, strain gauges 211 can be provided at the perforated plate and at the honeycomb cavity of the measured acoustic liner 201, and the stress of the measured acoustic liner 201 under high sound intensity can be measured through the strain gauges, according to which stress the acoustic and vibration response characteristics of the measured acoustic liner 201 can be evaluated. In an optional embodiment, an adjustment mechanism 205 is disposed in the test chamber 200 and the adjustment mechanism 205 can be arranged below the drag balance 203 in the gravity direction. The adjustment mechanism 205 can translate in any direction of the X-axis, Y-axis and Z-axis, i.e., realize translation in three dimensions X-Y-Z. The movement of the adjustment mechanism 205 can bring the drag balance 203, the acceleration transducer 202 and the measured acoustic liner 201 to move. Then the level of the measured acoustic liner 201 in the X-axis direction can be controlled by adjusting the movement of the adjustment mechanism 205 with accuracy of 0.001 mm. As shown in FIG. 3, the adjustment mechanism 205 can be disposed in the test chamber and the upper part of the adjustment mechanism 205 in the gravity direction can be connected to the drag balance 203.

As shown in FIGS. 1 and 2, a first microphone array 101, a second microphone array 102 and a third microphone array 103 can be arranged on the wall surface of the test section successively. The first microphone array 101 can be arranged in front of (upstream of) the measured acoustic liner 201, and the incident sound pressure level data of the incoming flow can be calculated according to the sound pressure data of the wall surface of the test section measured by the first microphone array 101. The second microphone array 102 can be arranged on the wall surface of the test section opposite to the measured acoustic liner 201, or can be arranged on the wall surface of the test section adjacent to the measured acoustic liner 201. For example, when the cross section of the flow duct is rectangular, that is, the cross section of the test section is rectangular, the sound-absorbing surface of the measured acoustic liner 201 can be flush with one side wall surface of the test section, and the second microphone array 102 can be arranged on another wall surface of the test section opposite to the measured acoustic liner 201 or adjacent to the measured acoustic liner 201. The acoustic impedance of the measured acoustic liner 201 at the corresponding frequency of the incident sound wave can be obtained according to the sound pressure data of the wall surface of the test section measured by the second microphone array 102. The third microphone array 103 can be arranged on the wall surface of the test section behind (downstream of) the measured acoustic liner 201. The sound pressure level data of the sound after passing through the test section corresponding to the measured acoustic liner 201 can be calculated according to the sound pressure data of the wall surface of the test section measured by the third microphone array 103. According to the incident sound pressure level data of the incoming flow and the sound pressure level data of the sound after passing through the test section corresponding to the measured acoustic liner 201, the transmission loss of the measured acoustic liner 201 at the corresponding frequency of the incident sound wave can be calculated. It should be noted that the number of microphones in each of the first 101, second 102, and third 103 microphone arrays can be selected by a worker according to the actual situation, and the distances between the first 101, second 102, and third 103 microphone arrays can also be selected by a worker according to the actual situation. For example, the first microphone array 101 and the third microphone array 103 can include at least two microphones, the number of microphones included in the first microphone array 101 and the third microphone array 103 can be equal, and the second microphone array 102 can include at least 16 microphones.

Figure 4:
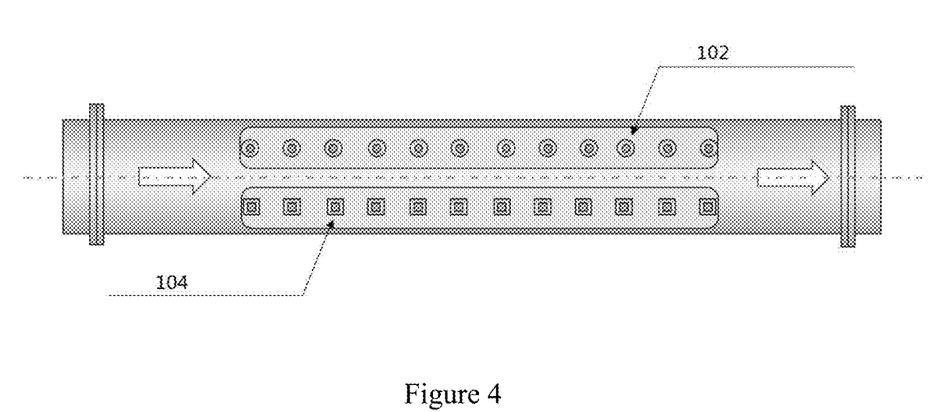
FIG. 4 is a schematic diagram of a wall surface of the test section of the comprehensive performance test platform for acoustic liner provided by the embodiments of the present disclosure.

In an optional embodiment, the wall surface of the test section can be provided with a pressure probe array 104. For example, the wall surface of the test section opposite to the measured acoustic liner 201 can be provided with the pressure probe array 104 or the pressure probe array 104 can be arranged on another wall surface of the test section adjacent to the measured acoustic liner 201. As shown in FIG. 4, when the wall surface of the test section opposite to the measured acoustic liner 201 is provided with the pressure probe array 104 and the second microphone array 102, the pressure probes in the pressure probe array 104 and the microphones in the second microphone array 102 can be arranged symmetrically along the central axis of the flow duct 100. As shown in FIG. 4, a circular mark represents a microphone in the second microphone array 102, a rectangular mark represents a pressure probe in the pressure probe array 104, and the pressure probes in the pressure probe array 104 and the microphones in the second microphone array 102 can be arranged symmetrically along the central axis of the flow duct 100. For example, the number of probes in the pressure probe array 104 and the number of microphones in the second microphone array 102 can be the same or different. The specific number of probes in the pressure probe array 104 can be selected by a worker according to the actual needs. For example, the number of pressure probes in the pressure probe array 104 can be at least 10. The pressure probes can be used to measure the static pressure of the airflow in the flow duct 100. After gradient processing of the static pressure in the flow direction measured by a plurality of pressure probes, it can be used to evaluate the drag of the measured acoustic liner 201.

Figure 5:
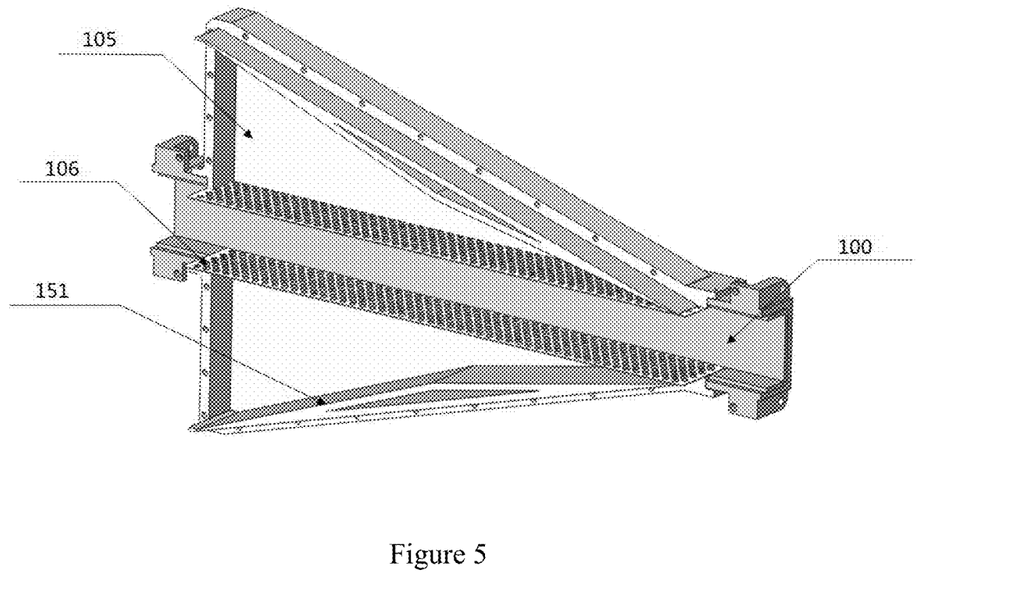
FIG. 5 is a schematic cross-sectional view of wedge-shaped structure of the comprehensive performance test platform for acoustic liner provided by the embodiments of the present disclosure.

In an optional embodiment, the flow duct 100 can include a first anechoic termination and a second anechoic termination. As shown in FIG. 1, the first anechoic termination can be set upstream of the acoustic source section and the second anechoic termination can be set downstream of the test section, that is, the first anechoic termination and the second anechoic termination can be located at two ends of the flow duct 100 respectively. It should be noted that the first anechoic termination and the second anechoic termination can be pipe units and the first anechoic termination, acoustic source section, test section and second anechoic termination can be spliced to form the flow duct 100. As shown in FIG. 1, the wall surface of each anechoic termination can be provided with at least two symmetrical wedge-shaped structures 105 and sound-absorbing materials can be provided in a cavity of the wedge-shaped structure 105. For example, the cavity of the wedge-shaped structure 105 can be provided with sound absorbing cotton. For example, when the cross section of the flow duct 100 is rectangular, that is, the cross section of the anechoic termination is rectangular, two opposite sides of the anechoic termination each can be provided with a wedge-shaped structure 105 and the two wedge-shaped structures 105 can be arranged symmetrically. In an optional embodiment, four sides of the anechoic terminations each can be provided with a wedge-shaped structure 105, and the four wedge-shaped structures 105 can be arranged symmetrically. As shown in FIG. 5, the outer wall surface of one side of the cavity of the wedge-shaped structure 105 can be a triangular support plate 151 so as to provide good support, and the wedge-shaped structure 105 can be connected to the anechoic termination via a perforated plate 106 with wire mesh. For example, the interface between the wedge-shaped structure 105 and the anechoic termination can be a perforated plate 106 with wire mesh and a large perforation rate, so the incoming background noise can enter the wedge-shaped structure 105 through the perforated plate 106 with wire mesh and can be absorbed in the wedge-shaped structure 105, while the airflow will not enter the wedge-shaped structure 105, so that the airflow background noise can be eliminated or reduced without affecting the flow of the airflow. The perforation rate of the perforated plate 106 can be 40%-60%. For example, the first anechoic termination can be used to reduce or eliminate the incoming noise and the second anechoic termination can be used to form a non-reflective boundary condition at the outlet of the flow duct 100. For example, the perforated plate for the measured acoustic liner 201 can be called the first perforated plate, and the perforated plate 106 with wire mesh at the interface between the wedge-shaped structure 105 and the anechoic termination can be called the second perforated plate.

Figure 6:
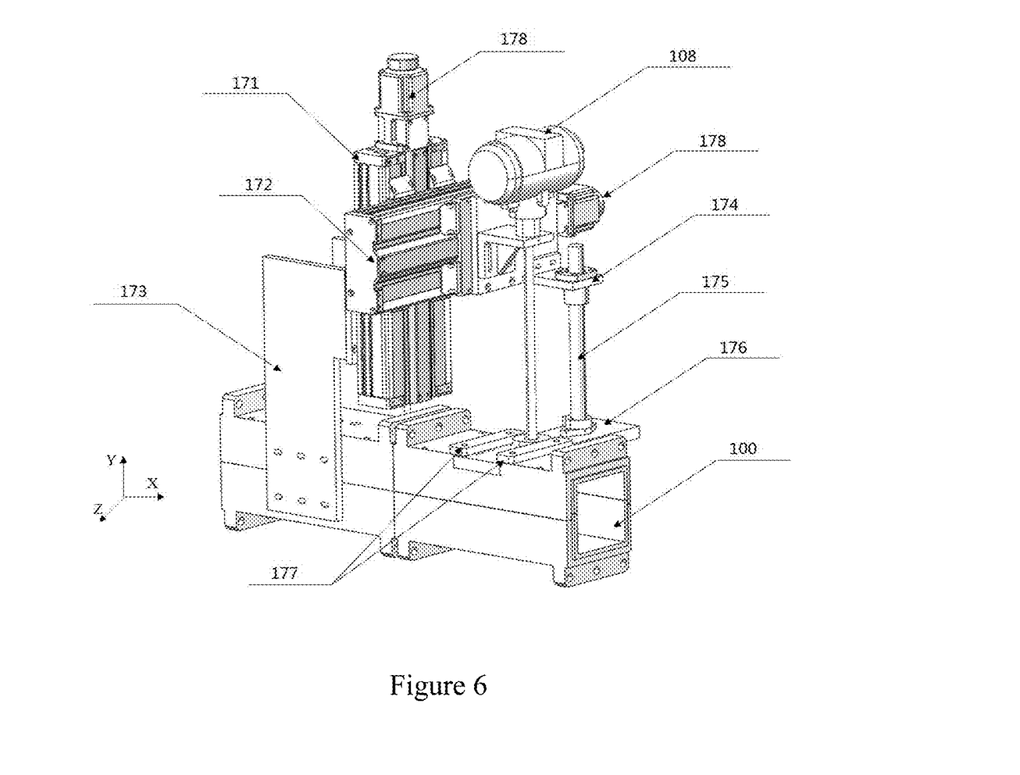
FIG. 6 is a schematic diagram of displacement mechanism 107 of the comprehensive performance test platform for acoustic liner provided by the embodiments of the present disclosure.

In an optional embodiment, the comprehensive performance test platform for acoustic liner provided by this embodiment includes a displacement mechanism 107 and a flow rate meter 108. The displacement mechanism 107 includes a first slide rail 171 and a second slide rail 172. The first slide rail 171 and the second slide rail 172 is respectively connected to the flow rate meter 108. The flow rate meter 108 is configured to measure the airflow velocity in the flow duct 100. Both the first slide rail 171 and the second slide rail 172 can be driven by a motor 178 to move the flow rate meter 108. For example, the first slide rail 171 and the second slide rail 172 can be driven respectively by a stepping motor. For example, the first slide rail 171 can slide in the direction of Y-axis and the second slide rail 172 can slide in the direction of Z-axis. When the first slide rail 171 is driven by the motor 178, the movement of the first slide rail 171 can cause the flow rate meter 108 to move in the direction of Y-axis and the accuracy of movement can reach 0.001 mm. When the second slide rail 172 is driven by the motor 178, the movement of the second slide rail 172 can cause the flow rate meter 108 to move in the direction of Z-axis and the accuracy of movement can reach 0.001 mm.

For example, as shown in FIG. 6, the displacement mechanism 107 can further include a support of slide rail 173, a sleeve 174, a connecting rod 175 and a slider 176. When the first slide rail 171 is driven by the motor 178, the movement of the first slide rail 171 can move the second slide rail 172, the sleeve 174 and the flow rate meter 108 in the direction of Y-axis. When the second slide rail 172 is driven by the motor 178, the movement of the second slide rail 172 can drive the first slide rail 171, the sleeve 174 and the flow rate meter 108 to move along the direction of Z-axis. The support of slide rail 173 is configured to support the first slide rail 171 and the second slide rail 172. The support of slide rail 173 can be fixedly connected to the flow duct 100, and the first slide rail 171 and the second slide rail 172 can move relative to the support of slide rail 173 when driven by the motor 178. Lubricating materials such as Teflon can be disposed between the slider 176 and the connecting rod 175. The slider 176 and the connecting rod 175 can be rigidly connected. The sleeve 174 is configured to accommodate the connecting rod 175 when the connecting rod 175 moves along the direction of Y-axis. For example, the surface of the connecting rod 175 can be smooth and there can be a small gap between the connecting rod 175 and the sleeve 174. The surface of the slider 176 can also be smooth, which can ensure smooth sliding between the surface of the slider 176 and the wall surface of the flow duct 100. When the flow rate meter 108 moves in the direction of Z-axis, by moving the slider 176 the rod of the flow rate meter 108 can be prevented from being damaged. As shown in FIG. 6, the slider 176 can be a rectangular block and the flow rate meter 108 can run through the slider 176 and then go into the flow duct 100, so that the airflow velocity/rate in the flow duct 100 can be measured by the flow rate meter 108. When the slider 176 does not need to move, the slider 176 can be fixed by at least two fixing blocks 177. For example, the fixing block 177, the slider 176 and the flow duct 100 can be fixed by screws. When it's need to move the slider 176, the screw can be loosened to loosen the fixed block 177, so as to facilitate the movement of the slider 176.

Figure 7:
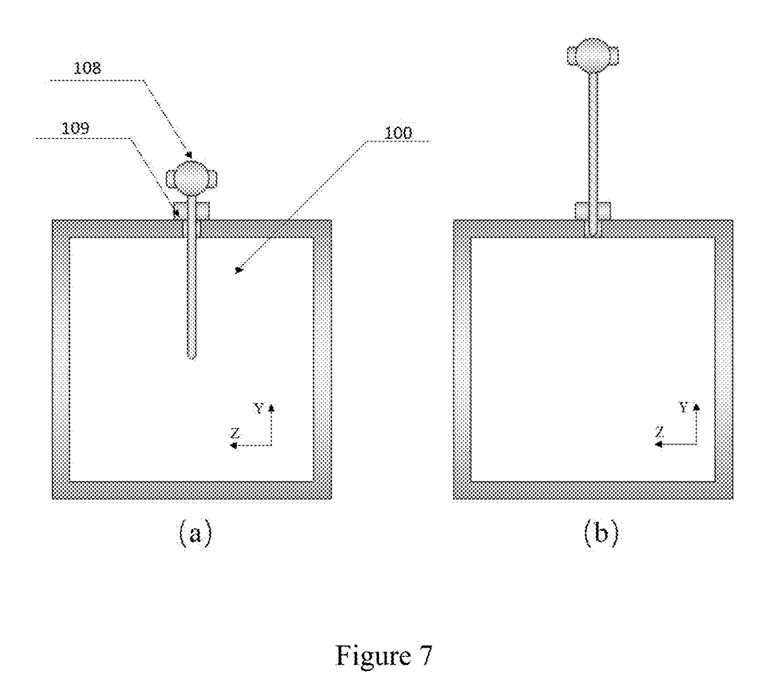
FIG. 7 is a schematic diagram of flow rate meter 108 of the comprehensive performance test platform for acoustic liner provided by the embodiments of the present disclosure.

For example, the flow rate meter 108 can be a pitot tube, a hot wire anemometer or a thermal mass flowmeter, and it can be used to measure the airflow velocity in the flow duct 100. Based on the movement of the flow rate meter 108 caused by the first slide rail 171 and the second slide rail 172, airflow velocity through the Y-Z section in the flow duct 100 and boundary layer velocity on the wall surface of the flow duct 100 can be measured by the flow rate meter 108. When it is need to measure the airflow velocity in the flow duct 100, as shown in FIG. 7 (a), the first slide rail 171 and/or the second slide rail 172 can move the flow rate meter 108 to extend into the flow duct 100. When it's not need to measure the airflow velocity in the flow duct 100 or after measuring the airflow velocity in the flow duct 100, as shown in FIG. 7 (b), the first slide rail 171 and/or the second slide rail 172 can move the flow rate meter 108 to extend out of the flow duct 100, so as to avoid the rod of the flow rate meter 108 from affecting the airflow and acoustic wave flow in the flow duct 100. It should be noted that when the first slide rail 171 and/or the second slide rail 172 moves the flow rate meter 108 to extend out of the flow duct 100, it does not mean that the flow rate meter 108 is completely separated from the flow duct 100. As shown in FIG. 7 (b), when the first slide rail 171 and/or the second slide rail 172 moves the flow rate meter 108 to extend out of the flow duct 100, it can be that the tip part of the flow rate meter 108 extends out the airflow channel in the flow duct 100, that is, the flow rate meter 108 extends out of the flow duct 100 means the flow rate meter 108 does not affect the airflow in the flow duct 100. In order to ensure the overall sealing of the comprehensive performance test platform for acoustic liner, a sealing element 109 can be set at the connection between the flow rate meter 108 and the flow duct 100. For example, a sealing ring can be provided at the connection between the flow rate meter 108 and the flow duct 100. It should be noted that FIGS. 1 and 7 only show the position of the displacement mechanism 107 and the flow rate meter 108 on the flow duct 100 for example. In practical use, the position of the displacement mechanism 107 and the flow rate meter 108 on the flow duct 100 can be set by a worker according to the actual needs.

In an optional embodiment, the first anechoic termination, the acoustic source section, the test section can be connected with the second anechoic termination through flanges 113 to form the flow duct 100. By connecting the sections with flanges 113, a worker can add or reduce some pipe units or adjust the position of each pipe unit according to the actual needs, which increases the flexibility of the comprehensive performance test platform for acoustic liner provided in this embodiment. The comprehensive performance test platform for acoustic liner provided in this embodiment can further include a bracket 110 and a pedestal 111 to support the flow duct 100 and the parts arranged on the flow duct 100. In order not to affect the flow of airflow in the flow duct 100, it will be better if the contact area between the bracket 110 and the flow duct 100 gets smaller.

In an optional embodiment, another wall surface of the test section adjacent or opposite to the measured acoustic liner 201 can be provided with a watch window 112. For example, when the cross section of the test section is rectangular, the measured acoustic liner 201 and the second microphone array 102 can be arranged on two opposite wall surfaces of the test section respectively and the wall surface of the flow duct 100 between the two opposite wall surfaces can be provided with the watch window 112, or when the second microphone array 102 is arranged on another wall surface of the test section adjacent to the measured acoustic liner 201, the watch window 112 can be arranged on a further wall surface of the test section opposite or adjacent to the measured acoustic liner 201. Exemplary, the second microphone array 102 and the pressure probe array 104 can be arranged on the same wall surface of the test section, but the watch window 112 is generally not set on the same wall surface of the test section as the second microphone array 102 or the pressure probe array 104. Part of the wall surface of the flow duct 100 can be made of a transparent material to form the watch window 112. For example, part of the wall surface of the flow duct 100 can be made of glass to form the watch window 112. Based on the schlieren method or particle image velocimetry (PIV), the micro flow on the sound-absorbing surface of the measured acoustic liner 201 can be observed through the watch window 112.

It should be noted that when the cross section of the flow duct 100 described in the example of this embodiment is rectangular, it means that the cross sections of the first anechoic termination, acoustic source section, test section and second anechoic termination are rectangular. When the cross section of one of the first anechoic termination, acoustic source section, test section and second anechoic termination described in the example of this embodiment is rectangular, it means that all the cross sections of the first anechoic termination, acoustic source section, test section and second anechoic termination are rectangular.

Based on the comprehensive performance test platform for acoustic liner provided by the embodiments of the present disclosure, the stress of the measured acoustic liner 201 under high sound intensity can be measured through the strain gauges 211 arranged on the measured acoustic liner 201, the drag of the measured acoustic liner 201 can be measured through the drag balance 203, and the acoustic performance parameters of the measured acoustic liner 201 can be calculated based on the sound pressure data obtained by the microphone arrays. That is, based on the comprehensive performance test platform for acoustic liner provided by the embodiments of the present disclosure, the stress, the drag and the acoustic performance parameters of the measured acoustic liner 201 can be measured simultaneously, which overcomes the problem of inaccurate experimental data obtained in inconsistent experimental conditions caused by conventional separate acoustic liner experiments.

By setting the first anechoic termination and the second anechoic termination, the background noise of the flow field can be reduced or eliminated without affecting the airflow, and the acoustic reflection at the outlet of the flow duct 100 can be eliminated. By setting loudspeaker array 301 including various numbers of loudspeakers on the acoustic source section and controlling the amplitude and phase of the loudspeakers in the loudspeaker array 301, the sound pressure level of the incident sound wave can be controlled to 150 dB or more on the premise that there is airflow in the flow duct 100. By setting a drag balance 203 below the measured acoustic liner 201 and setting pressure probe on the wall surface of the test section, the drag of the measured acoustic liner 201 can be obtained by both direct measurement and indirect measurement, so the accuracy of the experimental results can be verified. The drag and the acoustic performance of the measured acoustic liner 201 can be measured simultaneously and at the same time, the state of responding acoustic vibration can be monitored, so that the aerodynamic parameters and acoustic parameters of the measured acoustic liner 201 can be obtained under the same working condition, and the acoustic parameters can better reflect the actual situation.

In the description of this specification, the description of the terms "one embodiment/mode", "some embodiments/modes", "examples", "specific examples", or "some examples" means that the specific features, structures, materials, or characteristics described in connection with the embodiment/mode or example are included in at least one embodiment/mode or example of the present disclosure. In this specification, the schematic expression of the above terms does not necessarily refer to the same embodiment/mode or example. Moreover, the specific features, structures, materials, or characteristics described can be combined in any suitable manner in any one or more embodiments/modes or examples. In addition, without contradicting each other, those skilled in the art may combine different embodiments/modes or examples and features of the different embodiments/modes or examples described in this specification.

In addition, the terms "first" and "second" are only used for descriptive purposes and cannot be understood as indicating or implying relative importance or implicitly indicating the number of indicated technical features. The features defining "first" and "second" can include at least one of the features explicitly or implicitly. In the description of this disclosure, "plurality of" means at least two, such as two, three, etc., unless otherwise expressly and specifically defined.

Those skilled in the art should understand that the above-mentioned embodiments are only for clearly illustrating the present disclosure, rather than limiting the scope of the present disclosure. For those skilled in the art, other changes or modifications can be made on the basis of the above disclosure, and these changes or modifications are still within the scope of the present disclosure.

The invention claimed is:

1. A comprehensive performance test platform for acoustic liner, characterized in that, the test platform comprises a flow duct (100) and a test chamber (200), wherein,
   the flow duct (100) is configured to provide a channel for airflow;
   the flow duct (100) comprises an acoustic source section and a test section which is located downstream of the acoustic source section;
   a wall surface of the acoustic source section is provided with a loudspeaker array (301);
   the test chamber (200) is arranged on the test section, and interior of the test chamber (200) is provided with an acoustic liner to be measured (201), an acceleration transducer (202) and a drag balance (203);
   the measured acoustic liner (201) is provided with a strain gauge (211) and the measured acoustic liner (201) is connected to the acceleration transducer (202); the drag balance (203) is connected to a bearing tray (204) and the bearing tray (204) is fixedly connected to the measured acoustic liner; and
   the measured acoustic liner (201) is flush with the wall surface of the test section, the wall surface of the test section upstream of the measured acoustic liner (201) is provided with a first microphone array (101), the wall surface of the test section opposite or adjacent to the measured acoustic liner (201) is provided with a second microphone array (102), and the wall surface of the test section downstream of the measured acoustic liner (201) is provided with a third microphone array (103).

2. The comprehensive performance test platform for acoustic liner according to the claim 1, characterized in that,
   the wall surface of the acoustic source section is provided with N loudspeaker arrays (301) and N is an integer not less than 1; and
   any one of the N loudspeaker arrays (301) comprises M loudspeakers, which are arranged on the wall surface of the acoustic source section in a circumferential direction of the acoustic source section, and M is an integer not less than 1.

3. The comprehensive performance test platform for acoustic liner according to the claim 2, characterized in that,
   the flow duct (100) further comprises a first anechoic termination and a second anechoic termination, wherein,
   the first anechoic termination is set upstream of the acoustic source section and the second anechoic termination is set downstream of the test section;
   the wall surface of each anechoic termination is provided with at least two symmetrical wedge-shaped structures (105) and sound-absorbing materials are provided in a cavity of the wedge-shaped structure (105); and
   a perforated plate (106) with wire mesh forms an interface between the wedge-shaped structure (105) and the anechoic termination.

4. The comprehensive performance test platform for acoustic liner according to the claim 3, characterized in that, the wall surface of the test section is provided with a watch window (112).

5. The comprehensive performance test platform for acoustic liner according to the claim 1, characterized in that, strain gauges (211) are provided at a perforated plate and at a honeycomb cavity of the measured acoustic liner (201).

6. The comprehensive performance test platform for acoustic liner according to the claim 5, characterized in that, an adjustment mechanism (205) is disposed in the test chamber (200) and the adjustment mechanism (205) is connected to the drag balance (203).

7. The comprehensive performance test platform for acoustic liner according to the claim 4, characterized in that,
   the flow duct (100) further comprises a first anechoic termination and a second anechoic termination, wherein,
   the first anechoic termination is set upstream of the acoustic source section and the second anechoic termination is set downstream of the test section;
   the wall surface of each anechoic termination is provided with at least two symmetrical wedge-shaped structures (105) and sound-absorbing materials are provided in a cavity of the wedge-shaped structure (105); and
   a perforated plate (106) with wire mesh forms an interface between the wedge-shaped structure (105) and the anechoic termination.

8. The comprehensive performance test platform for acoustic liner according to the claim 7, characterized in that, the wall surface of the test section is provided with a watch window (112).

9. The comprehensive performance test platform for acoustic liner according to the claim 3, characterized in that,
the flow duct (100) further comprises a first anechoic termination and a second anechoic termination, wherein,
the first anechoic termination is set upstream of the acoustic source section and the second anechoic termination is set downstream of the test section;
the wall surface of each anechoic termination is provided with at least two symmetrical wedge-shaped structures (105) and sound-absorbing materials are provided in a cavity of the wedge-shaped structure (105); and
a perforated plate (106) with wire mesh forms an interface between the wedge-shaped structure (105) and the anechoic termination.

10. The comprehensive performance test platform for acoustic liner according to the claim 9, characterized in that, the wall surface of the test section is provided with a watch window (112).

11. The comprehensive performance test platform for acoustic liner according to the claim 1, characterized in that,
the wall surface of the test section is provided with a pressure probe array (104); when the wall surface of the test section opposite to the measured acoustic liner (201) is provided with the pressure probe array (104), pressure probes in the pressure probe array (104) and microphones in the second microphone array (102) are arranged symmetrically along a central axis of the flow duct (100).

12. The comprehensive performance test platform for acoustic liner according to the claim 11, characterized in that,
the flow duct (100) further comprises a first anechoic termination and a second anechoic termination, wherein,
the first anechoic termination is set upstream of the acoustic source section and the second anechoic termination is set downstream of the test section;
the wall surface of each anechoic termination is provided with at least two symmetrical wedge-shaped structures (105) and sound-absorbing materials are provided in a cavity of the wedge-shaped structure (105); and
a perforated plate (106) with wire mesh forms an interface between the wedge-shaped structure (105) and the anechoic termination.

13. The comprehensive performance test platform for acoustic liner according to the claim 12, characterized in that,
the test platform comprises a displacement mechanism (107) and a flow rate meter (108), wherein,
the displacement mechanism (107) comprises a first slide rail (171) and a second slide rail (172),
the first slide rail (171) and the second slide rail (172) are respectively connected to the flow rate meter (108),
the flow rate meter (108) is configured to measure the airflow velocity in the flow duct (100),
when the first slide rail (171) is driven by a motor (178), the first slide rail (171) move the flow rate meter (108) in a first direction; and
when the second slide rail (172) is driven by the motor (178), the second slide rail (172) move the flow rate meter (108) in a second direction.

14. The comprehensive performance test platform for acoustic liner according to the claim 13, characterized in that,
when it is needed to measure the airflow velocity in the flow duct (100), the first slide rail (171) and/or the second slide rail (172) causes the flow rate meter (108) to extend into the flow duct (100);
when it is not needed to measure the airflow velocity in the flow duct (100), the first slide rail (171) and/or the second slide rail (172) causes the flow rate meter (108) to extend out of the flow duct (100); and
a sealing element (109) is arranged where the flow rate meter (108) and the flow duct (100) are connected.

15. The comprehensive performance test platform for acoustic liner according to the claim 12, characterized in that, the wall surface of the test section is provided with a watch window (112).

16. The comprehensive performance test platform for acoustic liner according to the claim 1, characterized in that,
the flow duct (100) further comprises a first anechoic termination and a second anechoic termination, wherein,
the first anechoic termination is set upstream of the acoustic source section and the second anechoic termination is set downstream of the test section;
the wall surface of each anechoic termination is provided with at least two symmetrical wedge-shaped structures (105) and sound-absorbing materials are provided in a cavity of the wedge-shaped structure (105); and
a perforated plate (106) with wire mesh forms an interface between the wedge-shaped structure (105) and the anechoic termination.

17. The comprehensive performance test platform for acoustic liner according to the claim 6, characterized in that, the first anechoic termination, the acoustic source section, the test section and the second anechoic termination are connected through flanges (113).

18. The comprehensive performance test platform for acoustic liner according to the claim 6, characterized in that,
the test platform comprises a displacement mechanism (107) and a flow rate meter (108), wherein,
the displacement mechanism (107) comprises a first slide rail (171) and a second slide rail (172),
the first slide rail (171) and the second slide rail (172) are respectively connected to the flow rate meter (108),
the flow rate meter (108) is configured to measure the airflow velocity in the flow duct (100),
when the first slide rail (171) is driven by a motor (178), the first slide rail (171) move the flow rate meter (108) in a first direction; and
when the second slide rail (172) is driven by the motor (178), the second slide rail (172) move the flow rate meter (108) in a second direction.

19. The comprehensive performance test platform for acoustic liner according to the claim 8, characterized in that,
when it is needed to measure the airflow velocity in the flow duct (100), the first slide rail (171) and/or the second slide rail (172) causes the flow rate meter (108) to extend into the flow duct (100);
when it is not needed to measure the airflow velocity in the flow duct (100), the first slide rail (171) and/or the second slide rail (172) causes the flow rate meter (108) to extend out of the flow duct (100); and
a sealing element (109) is arranged where the flow rate meter (108) and the flow duct (100) are connected.

20. The comprehensive performance test platform for acoustic liner according to the claim 6, characterized in that, the wall surface of the test section is provided with a watch window (112).

* * * * *